United States Patent [19]
Nysted

[11] 3,920,635
[45] Nov. 18, 1975

[54] (6S)-17'-HYDROXY-3'-OXOSPIRO[OXIRANE-2,6'-[17α]PREGN[4]ENE]-21'-CARBOXYLIC ACID γ-LACTONE, THE Δ$^{1,4}$ ANALOG, AND INTERMEDIATES

[75] Inventor: Leonard N. Nysted, Highland Park, Ill.

[73] Assignee: G. D. Searle & Co., Chicago, Ill.

[22] Filed: Nov. 27, 1974

[21] Appl. No.: 527,523

[52] U.S. Cl. ...................... 260/239.57; 260/239.57
[51] Int. Cl.$^2$ ........................................... C07J 19/00
[58] Field of Search ............................... 260/239.57

[56] References Cited
UNITED STATES PATENTS
3,463,776  8/1969  Lester et al. ................... 260/239.57
3,499,891  3/1970  Colton et al. .................. 260/239.57

*Primary Examiner*—Elbert L. Roberts
*Attorney, Agent, or Firm*—John M. Brown

[57] ABSTRACT

Preparation and the desoxycorticosterone acetate-blocking, antiestrogenic, and progestational properties of (6S)-17'-hydroxy-3'-oxospiro[oxirane-2,6'-[17α]pregn-[4]ene]-21'-carboxylic acid γlactone and the Δ$^{1,4}$ analog thereof are disclosed.

8 Claims, No Drawings

(6S)-17'-HYDROXY-3'-OXOSPIRO[OXIRANE-2,6'-[17α]PREGN[4]ENE]-21'-CARBOXYLIC ACID γ-LACTONE, THE Δ¹,⁴ ANALOG, AND INTERMEDIATES

This invention relates to (6S)-17'-hydroxy-3'-oxospiro[oxirane-2,6'-[17α]pregn[4]ene]-21'-carboxylic acid γ-lactone, the Δ¹,⁴ analog thereof, and intermediates thereto. More particularly, this invention provides new, useful, and unobvious chemical compounds of the formula

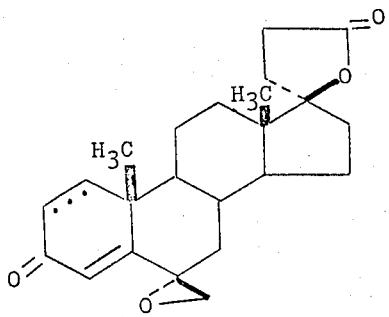

wherein the endocyclic dotted line denotes optional Δ¹ unsaturation.

The compounds enformulated above are useful by reason of their valuable biological properties. Thus, for example, they are desoxycorticosterone acetate (DCA) blockers: They reverse the effect of DCA on urinary sodium and potassium. They are also antiestrogenic and progestational.

The capacity of the instant compounds to reverse the renal electrolyte effects of DCA is evident from the results of a standardized test for this property carried out in rats substantially as described by C. M. Kagawa in chapter 34 of volume II of "Evaluation of Drug Activities: Pharmacometrics" by D. R. Laurence and A. L. Bacharach. Details of such testing are described in U.S. Pat. Nos. 3,422,096 and 3,622,631. By way of illustration, but not delimiting, the medium effective subcutaneous dose of the product of Example 1E hereinafter, in testing carried out substantially as described in the aforesaid patents, was found to be 0.19 mg.

The antiestrogenic utility of the instant compounds is evident from the results of a standardized test for this property carried out substantially as described in U.S. Pat. No. 3,475,420. Again by way of illustration only, the product of Example 1E hereinafter was found active at a total dose of 30 mcgm in such test.

The progestational utility of the instant compounds is evident from the results of a standardized test for this property carried out substantially as described in U.S. Pat. No. 3,539,558. Still further by way of illustration only, the product of Example 1E hereinafter was found to have a potency 10% that of progesterone when so tested.

Those skilled in the art will recognize that observations of activity in standardized tests for particular biological effects are fundamental to the development of valuable new drugs, both veterinary and human.

Preparation of (6S)-17'-hydroxy-3'-oxospiro= [oxirane-2,6'-[17α]pregn[4]ene]-21'-carboxylic acid γ-lactone and the Δ¹,⁴ analog thereof can be effected by contacting 3β-acetyloxy-5α, 17-dihydroxy-6-oxo-17α-pregnane-21-carboxylic acid γ-lactone (U.S. Pat. No. 3,012,029, Ex. 13) with the complex (U.S. Pat. No. 3,634,469, Ex. 2) formed in situ by heating activated zinc with dibromomethane in tetrahydrofuran under nitrogen, using aluminum isopropoxide to catalyze the complex formation; contacting the resultant 3β-acetyloxy-5α,17-dihydroxy-6-methylene-17α-pregnane-21-carboxylic acid γ-lactone with 3-chlorobenzeneperoxoic acid in dichloromethane, whereby (6R)-3'β-acetyloxy-5'α,17'-dihydroxyspiro[oxirane-2,6'-[17α]= pregnane]-21'-carboxylic acid γ-lactone is obtained; saponifying the ester linkage therein by contacting it with sodium hydroxide in aqueous methanol and then acidifying with dilute acetic acid; selectively oxidizing the 3β-ol in either (6 R)-3'β,5'α, 17'-trihydroxyspiro[oxirane-2,6'-[17α]pregnane]-21'-carboxylic acid, the γ-lactone thereof, or a mixture of the two thus obtained via contact in acetone with Jones reagent [prepared by dissolving 10 parts of chromic acid in 20 parts of water and consecutively adding 15 parts of concentrated sulfuric acid and 20 parts of water]; and heating the (6R)-5'α,17'-dihydroxy-3'-oxospiro[oxirane-2,6'-[17α]pregnane]-21'-carboxylic acid γ-lactone which eventuates with activated magnesium silicate (Florisil) in benzene to induce Δ⁴ dehydrogenation. From (6S)-17'-hydroxy-3'-oxospiro[oxirane-2,6'-[17α]pregn[4]ene]-21'-carboxylic acid γ-lactone, on heating with 2,3-dichloro-5,6-dicyanobenzoquinone in benzene, (6S)-17'-hydroxy-3'-oxospiro[oxirane-2,6'-[17α]pregna-1,4-diene]-21'-carboxylic acid γ-lactone is obtained.

Alternatively, (6R)-5'α,17'-dihydroxy-3'-oxospiro=[oxirane-2,6'-[17α]pregnane]-21'-carboxylic acid γ-lactone can be obtained by heating 3β-acetyloxy-5α,17-dihydroxy-6-methylene-17α-pregnane-21-carboxylic acid γ-lactone with potassium bicarbonate in aqueous methanol to give 3β,5α,17-tri=hydroxy-6-methylene-17α-pregnane-21-carboxylic acid γ-lactone, oxidizing the 3β-ol therein with Jones reagent in acetone; and contacting the resultant 5α,17-dihydroxy-6-methylene-3-oxo-17α-pregnane-21-carboxylic acid γ-lactone with 3-chlorobenzene=peroxoic acid in dichloromethane.

Those skilled in the art will recognize that hydroxy acids — and their salts and esters — corresponding to such lactones as those herein described are commonly equivalent thereto for the purposes attributed. Among the acids, salts, and esters referred to, preferred embodiments are those wherein the 17α (or 17'α) side-chain has the formula

in which M represents hydrogen, alkali metal, alkaline earth metal/2, ammonium, or lower alkyl. Those skilled in the art will recognize that the term "alkaline earth metal/2" reflects the fact that such metals are divalent, whereas the other substituents represented by M are monovalent.

Equivalence also exists as between any of the compounds contemplated herein and a solvate thereof in which biologically insignificant solvent is present.

Salts of the hydroxy acids corresponding to the lactones herein described can be prepared by heating alcoholic solutions of the lactones with appropriate bases — viz., lithium hydroxide, sodium hydroxide, potassium hydroxide, barium hydroxide, strontium hydroxide, calcium hydroxide, or the like. The acids of the invention can be prepared by precipitating aqueous solutions of the salts with excess acid. As an exception to the foregoing salt preparations, the contemplated ammonium salts can be prepared by prolonged contact of the acids with saturated alcohol solutions of ammonia. The contemplated esters can be prepared by contacting the alkali salts with lower alkyl bromides in N,N-dimethylformamide containing excess potassium bicarbonate.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. To a mixture of 65 parts of powdered zinc and 145 parts of tetrahydrofuran at the boiling point under reflux in a nitrogen atmosphere is added, with stirring during 10 minutes, 35 parts of a 20% solution of hydrogen chloride in dioxane, followed after 20 minutes by 5 parts of aluminum isopropoxide. Approximately 5 minutes later, introduction of 70 parts of dibromomethane is commenced, the rate being such as to require approximately 2½ hours for completion. Heating at the boiling point under reflux with stirring is continued throughout this operation and for approximately 14 hours thereafter, at which point the temperature of the reaction mixture is lowered to −10° and 42 parts of 3β-acetyloxy-5α,17-dihydroxy-6-oxo-17α-pregnane-21-carboxylic acid γ-lactone is stirred in during 10 minutes. The reaction mixture is then warmed to room temperature during 1 hour and maintained thereat for a further 2 hours, stirring being continued throughout. At this point the temperature of the reaction mixture is again lowered, this time to around 5°, at which temperature 100 parts of aqueous 50% acetic acid is added slowly so long as gas evolution continues and rapidly thereafter. The temperature of the reaction mixture rises to around 28° during this operation. Insoluble solids are filtered out, and the filtrate is vigorously steam-distilled until the tacky solids which precipitate in the distilland become crystalline. The crystalline material is filtered from the hot distilland, washed with water, and sufficiently dried to be taken up in approximately 65 parts of dichloromethane. The dichloromethane solution is filtered through diatomaceous earth, which is then washed with 140 parts of 2-propanone. Washings and filtrate are combined and distilled while 175 parts of water is slowly added. Crystallization occurs. Distillation is continued for a short time thereafter, whereupon the crystals are filtered off, washed well with aqueous 50% acetone, and dried in vacuo at 60°. The product thus isolated is 3β-acetyloxy-5α,17-dihydroxy-6-methylene-17α-pregnane-21-carboxylic acid γ-lactone.

B. To a solution of 128 parts of 3β-acetyloxy-5α,17-dihydroxy-6-methylene-17α-pregnane-21-carboxylic acid γ-lactone in 875 parts of dichloromethane at −5° is added, with stirring, 77 parts of 3-chlorobenzeneperoxoic acid. Stirring is continued for 2 hours while the temperature of the reaction mixture is allowed to rise to around 20°. Stirring is continued at this temperature for one-half hour, whereupon the temperature is again lowered to −5° and 65 parts of aqueous 30% sodium bisulfite thereupon introduced during 5 minutes, followed by 1450 parts of aqueous 20% potassium bicarbonate. Dichloromethane is then removed by vacuum distillation; and insoluble solids are separated from the distilland by filtration, consecutively washed with aqueous 20% potassium bicarbonate and water, and dried in vacuo at around 40°. The product thus isolated is (6R)-3'β-acetyloxy-5'α,17'-dihydroxyspiro[oxirane-2,6'-[17α]pregnane]-21'-carboxylic acid γ-lactone. The product has the formula

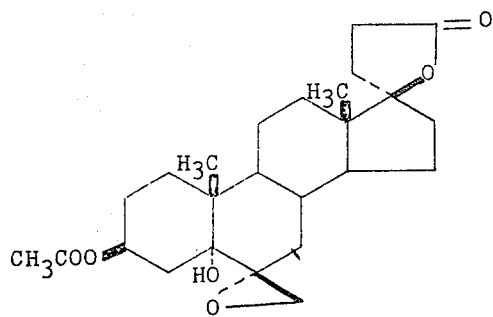

C. To a mixture of 117 parts of (6R)-3'β-acetyloxy-5'α,17'-dihydroxyspiro[oxirane-2,6'-[17α]=pregnane]-21'-carboxylic acid γ-lactone and 325 parts of methanol at −5° is added, with stirring, a mixture of 66 parts of aqueous 50% sodium hydroxide and 60 parts of methanol. Stirring is continued while the reaction mixture is allowed to warm to room temperature and for 2 hours thereafter, at which point methanol is removed by distillation in vacuo at around 40°. The crystalline residue is taken up in 1000 parts of water. The resultant solution is neutralized by slowly adding 36 parts of glacial acetic acid. The solid which precipitates is isolated by filtration, washed with water, and dried in vacuo at 60°. This material is a mixture of (6R)-3'β,5'α,17'-trihy- =oxyspiro[oxirane-2,6'-[17α]pregnane]-21'-carboxylic acid and the γ-lactone thereof, which is separable by chromatographic adsorption on silica gel and the use of benzene and mixtures thereof with increasing amounts of ethyl acetate as developing solvents.

D. To a rapidly-stirred suspension of 103 parts of a mixture of (6R)-3'β,5'α,17'-trihydroxyspiro=[oxirane-2,6'-[17α]pregnane]-21'-carboxylic acid and the γ-lactone thereof in 660 parts of 2-propanone at −10° is added, during 45 minutes, 170 parts of Jones reagent. The reaction mixture is warmed to 0° and maintained thereat for 45 minutes, whereupon 80 parts of 2-propanol is introduced, followed 15 minutes later by 1600 parts of water-stirring being continuous throughout. Insoluble solids which precipitate are filtered off; consecutively washed with water, aqueous 5% potassium bicarbonate, and water; and dried in vacuo at 45°. The product thus isolated is (6R)-5'α,17'-dihydroxy-3'-oxospiro[oxirane-2,6'-[17α]=pregnane]-21'-carboxylic acid γ-lactone.

E. A suspension of 250 parts of activated magnesium silicate (Florisil) in approximately 725 parts of benzene is stirred and distilled until anhydrous, whereupon 50 parts of (6R)-5'α,17'-dihydroxy-3'-oxospiro=[oxirane-2,6'-[17α]pregnane]-21'-carboxylic acid γ-lactone is added; and the resultant mixture is heated at the boiling point under reflux with stirring for 3½ hours. At that point, the reaction mixture is cooled to around 35°, at which temperature approximately 675 parts of dichloromethane is stirred in. Stirring is continued for a further 15 minutes, whereupon insoluble solids are filtered out and washed with dichloromethane. Washings and filtrate are combined and stripped of solvent by vacuum distillation. The residue is crystallized from a mixture of dichloromethane, 2-propanone, and water by the procedure described in Example 1A. The colorless solid thus obtained is (6S)-17'-hydroxy-3'-oxospiro[oxirane-2,6'-[17α]pregn[4]ene]-21'-carboxylic acid γ-lactone melting at 280°–285°. The product has the formula

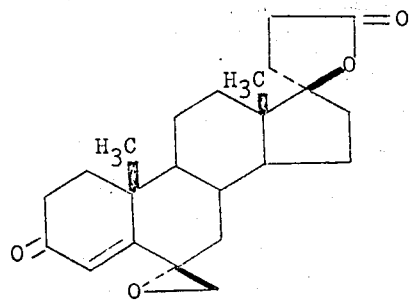

EXAMPLE 2

A solution of 2 parts of (6S)-17'-hydroxy-3'-oxospiro[oxirane-2,6'-[17α]pregn[4]ene]-21'-carboxylic acid γ-lactone and 3 parts of 2,3-dichloro-5,6-dicyano=benzoquinone in 90 parts of benzene is heated at the boiling point under reflux in a nitrogen atmosphere for 48 hours, then filtered. The filtrate is first washed with aqueous 10% sodium bisulfite and thereafter with just sufficient aqueous 10% potassium bicarbonate containing a trace of sodium hydroxide to induce a color change from intense to pale yellow, whereupon it is dried over anhydrous sodium sulfate and finally stripped of solvent by vacuum distillation. The residue is crystallized from a mixture of dichloromethane and methanol to give (6S)-17'-hydroxy-3'-oxospiro[oxirane-2,6'-[17α]pregna[1,4]=diene]-21'-carboxylic acid γ-lactone.

EXAMPLE 3

A. A mixture of 23 parts of 3β-acetyloxy-5α,17-dihydroxy-6-methylene-17α-pregnane-21-carboxylic acid γ-lactone, 24 parts of potassium bicarbonate, 180 parts of methanol, and 22 parts of water is heated at the boiling point under reflux for 5 hours, then cooled to 30° and diluted with 36 parts of acetic acid. Methanol is removed from the resultant solution by vacuum distillation. Approximately 200 parts of water is added to the distilland, and the soluble solids thereby precipitated are filtered off and sufficiently dried to be taken up in 120 parts of methanol. Approximately 5 parts of concentrated hydrochloric acid is added to the methanol solution, followed by just sufficient water to induce turbidity. On standing, chilled, 3β,5α,17-trihydroxy-6-methylene-17α-pregnane-21-carboxylic acid γ-lactone monohydrate precipitates. The product is isolated by filtration and dried in vacuo. Water of crystallization can be removed by vacuum drying at elevated temperatures.

B. Substitution of 103 parts of 3β,5α,17-trihydroxy-6-methylene-17α-pregnane-21-carboxylic acid γ-lactone for the (6S)-3'β,5'α,17'-trihydroxyspiro[oxirane-2,6'-[17α]pregnane]-21'-carboxylic acid γ-lactone called for in Example 1D affords, by the procedure there detailed, 5α,17-dihydroxy-6-methylene-3-oxo-17α-pregnane-21-carboxylic acid γ-lactone.

C. Substitution of 112 parts of 5α,17-=droxy-6-methylene-3-oxo-17α-pregnane-21-carboxylic acid γ-lactone for the 3β-acetyloxy-5α,17-dihydroxy-6-methylene-17α-pregnane-21-carboxylic acid γ-lactone called for in Example 1B affords, by the procedure there detailed, (6R)-5'α,17'-dihydroxy-3'-oxospiro[oxirane-2,6'[17α]=pregnane]-21'-carboxylic acid γ-lactone.

EXAMPLE 4

A mixture of 37 parts of (6S)-17'-hydroxy-3'-oxospiro[oxirane-2,6'-[17α]pregn[4]ene]-21'-carboxylic acid γ-lactone, 95 parts of aqueous 4% sodium hydroxide, 950 parts of water, and 160 parts of 2-propanol is stirred and heated at around 60° for 3 hours, whereupon the mixture is concentrated to approximately one-tenth its original volume by vacuum distillation. Sufficient 2-propanone is then added to induce the separation of a gel, which is isolated by filtration, washed with acetone, and dried in vacuo at 100°. The product thus isolated is sodium (6S)-17'-hydroxy-3'-oxospiro[oxirane-2,6'-[17α]pregn[4]ene]-21'-carboxylate monohydrate.

What is claimed is:
1. A compound of the formula

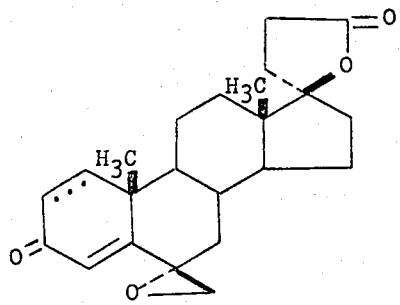

wherein the endocyclic dotted line denotes optional Δ¹ unsaturation.

2. A compound according to claim 1 which is (6S)-17'-hydroxy-3'-oxospiro[oxirane-2,6'-[17α]pregn[4]=ene]-21'-carboxylic acid γ-lactone.

3. A compound according to claim 1 which is (6S)-17'-hydroxy-3'-oxospiro[oxirane-2,6'-[17α]pregna=[1,4]diene]-21'-carboxylic acid γ-lactone.

4. A compound of the formula

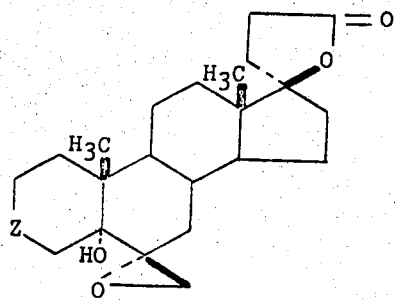

wherein Z represents β-(acetyloxy)methylene, β-hydroxy=methylene, or carbonyl.

5. A compound according to claim 4 which is (6R)-5'α,17'-dihydroxy-3'-oxospiro[oxirane-2,6'-[17α]=pregnane]-21'-carboxylic acid γ-lactone.

6. A compound of the formula

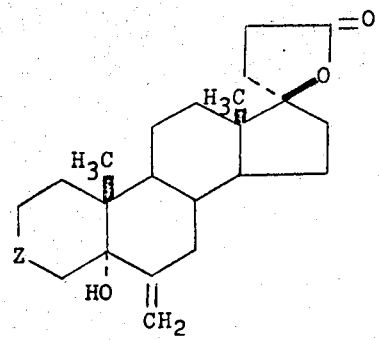

wherein Z represents β-(acetyloxy)methylene, β-hydroxy=methylene, or carbonyl.

7. A compound according to claim 6 which is 3β,5α,17-trihydroxy-6-methylene-17α-pregnane-21-carboxylic acid γ-lactone.

8. A compound according to claim 6 which is 5α,17-dihydroxy-6-methylene-3-oxo-17α-pregnane-21-carboxylic acid γ-lactone.

* * * * *

UNITED STATES PATENT OFFICE
CERTIFICATE OF CORRECTION

PATENT NO. : 3,920,635
DATED : Nov. 18, 1975
INVENTOR(S) : Leonard N. Nysted

It is certified that error appears in the above-identified patent and that said Letters Patent are hereby corrected as shown below:

Abstract, line 5, "γlactone" should read
-- γ-lactone --.

Column 4, line 43, "trihy" should read
-- trihydro --.

Column 6, line 17, "=droxy" should read
-- dihydroxy --.

Signed and Sealed this thirteenth Day of April 1976

[SEAL]

Attest:

RUTH C. MASON
*Attesting Officer*

C. MARSHALL DANN
*Commissioner of Patents and Trademarks*